US 6,416,721 B1

(12) United States Patent
Sanjurjo et al.

(10) Patent No.: US 6,416,721 B1
(45) Date of Patent: Jul. 9, 2002

(54) FLUIDIZED BED REACTOR HAVING A CENTRALLY POSITIONED INTERNAL HEAT SOURCE

(75) Inventors: Angel Sanjurjo, San Jose; Kai Hung Lau, Cupertino, both of CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 09/410,337

(22) Filed: Oct. 1, 1999

Related U.S. Application Data
(60) Provisional application No. 60/102,818, filed on Oct. 2, 1998.

(51) Int. Cl.[7] .......................... F28D 13/00; F27B 15/14; B01J 8/18
(52) U.S. Cl. ...................... 422/146; 422/139; 422/140; 422/198
(58) Field of Search ................. 422/139, 140, 422/146, 198

(56) References Cited

U.S. PATENT DOCUMENTS

| 4,050,951 A | 9/1977 | Piccolo et al. ............... 106/446 |
| 4,684,513 A | 8/1987 | Iya .............................. 423/349 |
| 4,904,452 A | 2/1990 | Acharya et al. ............ 422/146 |
| 5,006,317 A | 4/1991 | Sanjurjo ..................... 117/207 |
| 5,165,908 A | 11/1992 | Van Slooten et al. ........ 423/349 |
| 5,171,734 A | 12/1992 | Sanjurjo et al. ............. 505/447 |
| 5,227,195 A | 7/1993 | Sanjurjo ................... 427/248.1 |
| 5,374,413 A | 12/1994 | Kim et al. .................. 423/349 |
| 5,810,934 A | 9/1998 | Lord et al. .................. 118/725 |
| 6,039,894 A | * 3/2000 | Sanjurjo et al. ...... 252/301.4 R |

FOREIGN PATENT DOCUMENTS

WO    WO-96/36441 A1 * 11/1996

* cited by examiner

*Primary Examiner*—Jerry D. Johnson
*Assistant Examiner*—Alexa A. Doroshenk
(74) *Attorney, Agent, or Firm*—Bozicevic, Field & Francis LLP

(57) ABSTRACT

Fluidized bed reactors having centrally positioned heating means, as well as methods for their use, are provided. The subject reactors comprise a centrally positioned heating means (e.g. a susceptor rod) that, during operation, is at least partially immersed in a fluidized bed of particles. The subject reactors are further characterized in that, during use, a temperature gradient is produced within the reactor. The subject reactors find use in a variety of applications.

25 Claims, 2 Drawing Sheets

FLUIDIZED BED REACTOR HAVING A CENTRALLY POSITIONED INTERNAL HEAT SOURCE

This application is entitled to the benefit of Provisional Application Ser. No. 60/102,818, filed on Oct. 2, 1998.

TECHNICAL FIELD

The present invention relates generally to moving bed reactors, and more particularly to fluidized bed reactors.

BACKGROUND

Fluidized bed reactors are reactors in which a particulate composition, e.g. a powder, is floated inside a reaction vessel on a cushion of fluidizing medium, e.g. air or other gaseous medium, such that the particulate becomes quasi-fluid in character. Fluidized bed reactors find use in a variety of different industries, including the petrochemical, silicon based and pharmaceutical industries.

Because of their importance, a variety of different fluidized bed reactors have been designed to meet the particular needs of a given application. For example, a number of different fluidized bed reactor designs have been developed to specifically be used in the production of high purity silicon for the computer industry and related fields. Examples of various fluidized bed reactor designs are provided in U.S. Pat. Nos. 4,904,452; 5,006,317; 5,165,908; 5,171,734; 5,227,195; 5,374,413; and 5,810,934, the disclosures of which are herein incorporated by reference.

Despite the abundance of fluidized bed reactor designs known in the art, there is continued interest in the development of new reactor designs that provide for improvements, at least with respect to one or more particular applications.

SUMMARY OF THE INVENTION

Fluidized bed reactors having a centrally positioned heating means, e.g. a susceptor rod, as well as methods for their use, are provided. During operation of the reactor, the heating means is at least partially immersed in a fluidized particle bed in said reactor. The subject reactors are further characterized by having a temperature gradient within the reactor vessel during use. The subject reactors find use in a variety of different applications.

It is accordingly an object of the invention to provide a fluidized bed reactor with a centrally positioned heating means that is at least partially immersed in a fluidized particle bed.

It is another object of the invention to provide methods of using the subject fluidized bed reactors.

Additional objects, advantages and novel features of the invention will be set forth in part in the description which follows, and in part will become apparent to those skilled in the art upon examination of the following, or may be learned by practice of the invention.

DEFINITIONS

Figure 1:
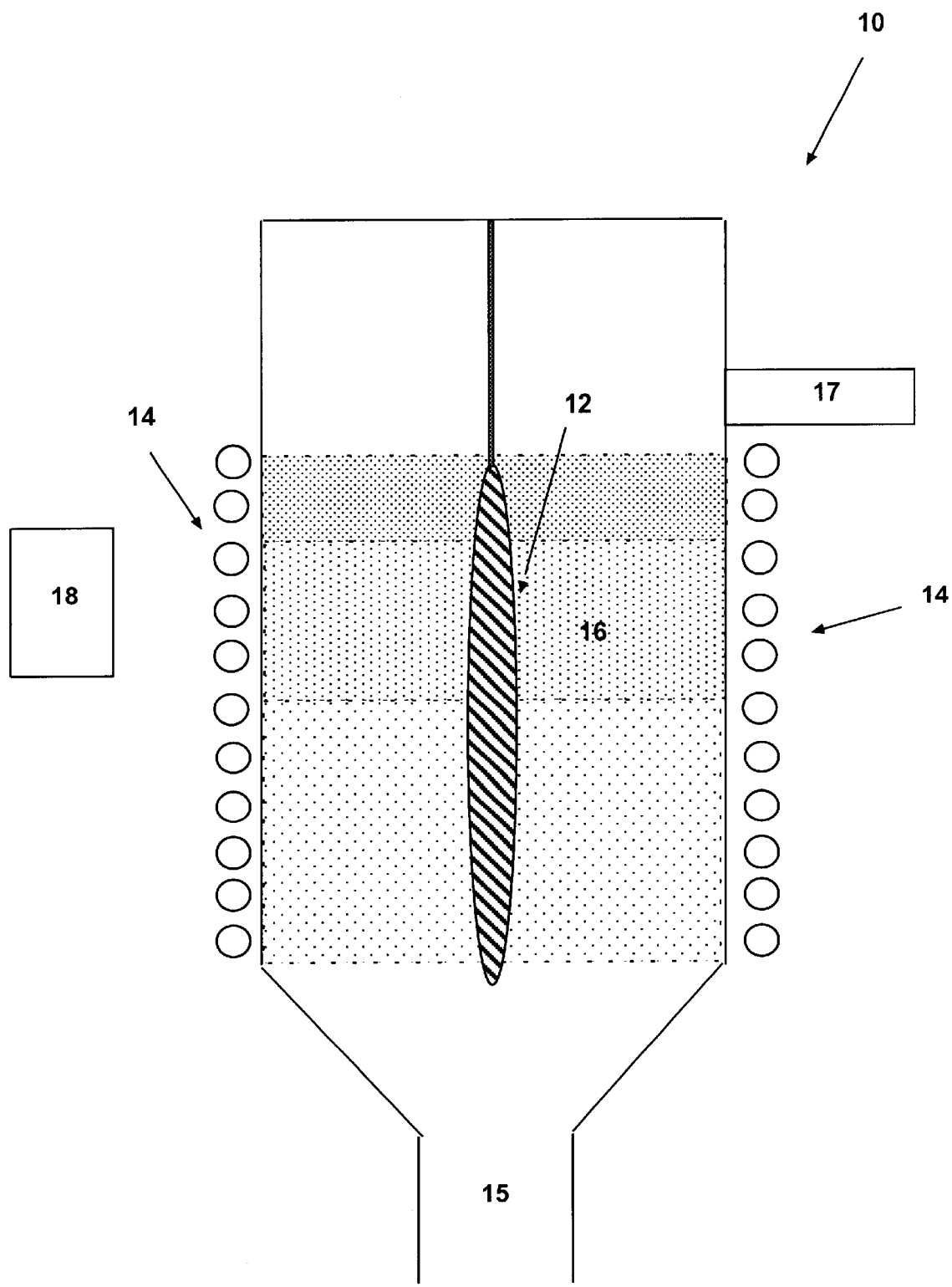
FIG. 1 provides a representation of a reactor according to the subject invention in which a susceptor rod is centrally located within the reactor vessel and heated by externally positioned RF coils. The susceptor rod is completely immersed in the fluidized particle bed within the reactor vessel.

As used herein all reference to the Periodic Table of the Elements and groups thereof is to the version of the table published by the Handbook of Chemistry and Physics, CRC Press, 1995, which uses the IUPAC system for naming groups.

DETAILED DESCRIPTION OF THE INVENTION

Fluidized bed reactors having centrally positioned heating means, as well as methods for their use, are provided. In the subject reactors, the centrally positioned heating means is at least partially immersed in a fluidized particle bed during operation. In addition, the centrally positioned heating means produces a temperature gradient inside the reactor vessel during operation. The subject reactors find use in a variety of applications.

Before the present processes and products are disclosed and described, it is to be understood that this invention is not limited to specific processes, particles or the like, as such may vary. It is also to be understood that the terminology used herein is for the purpose of describing particular embodiments only and is not intended to be limiting.

It must be noted that as used in this specification and the appended claims, the singular forms "a," "an," and "the" include plural reference unless the context clearly dictates otherwise. Unless defined otherwise all technical and scientific terms used herein have the same meaning as commonly understood to one of ordinary skill in the art to which this invention belongs.

The fluidized bed reactors of the subject invention comprise a reactor vessel capable of housing the fluidized particle bed and a centrally positioned heating means, as described in greater detail below. The reactor vessel design may be any convenient design, but will generally be cylindrical, conical or paralepipedic, and usually will be cylindrical. The volume of the reactor vessel may vary widely, including any of the dimensions of the reactor vessels of U.S. Pat. Nos. 4,904,452; 5,006,317; 5,165,908; 5,171,734; 5,227,195; 5,374,413; and 5,810,934, the disclosures of which are herein incorporated by reference.

The reactor vessel (or at least the internal walls thereof) is fabricated from a non-conductive material, where a variety of suitable non-conductive materials are known. Suitable non-conductive materials include: quartz, glass, sapphire, ceramics, e.g. alumina, titania, zirconia, magnesia, mullite, and the like. Of particular interest in many embodiments are reactor vessels in which at least the internal walls of the vessel are fabricated from a transparent non-conductive material. Transparent non-conductive materials of interest include: quartz, glass, sapphire, silicon nitride, AlN and alumina.

A critical feature of the subject reactors is the presence of one or more heating means centrally positioned inside the reactor vessel. By "centrally positioned" is meant that one or more distinct heating means is located along the axis of the reactor vessel such that the distance between the heating means and any two opposite sides of the reactor vessel is the same. In other words, the heating means is equidistant from any two give opposite sides of the reactor vessel.

In the broadest aspect of the invention, the heating means may be a variety of different components capable of providing thermal energy to the contents of the reactor vessel. Thus, the heating means may, in certain embodiments, be a flame. In other embodiments, the heating means may be a radiant burner, such as a SiC tube, and the like. In yet other embodiments, the heating means may be an electrical arc generating means.

In many preferred embodiments of the subject invention, the centrally positioned heating means is a susceptor rod made of a conductive material. Generally, the conductive material will be graphite, a metal or a cermetal. Preferably, the conductive material of the susceptor rod is encapsulated in an inert material, such as quartz, AlN, $Si_3N_4$, magnesia, alumina and the like. For example, with graphite conductive materials, the graphite rod will, in many embodiments, be surrounded with a thin layer of alumina or zirconia and then sealed in an evacuated quartz tube.

The subject reactors are further characterized in that the heating means, e.g. susceptor rod, is at least partially immersed in a fluidized particle bed inside the reactor vessel during operation. By at least partially immersed is meant that the heating means extends at least partially, and in some embodiments completely, into the fluidized bed of particles in the reactor vessel. For example, where the heating means is a susceptor rod, generally at least 10% of the length of the rod, usually at least about 25% of the length of the rod, and in many embodiments at least about 50% of the length of the susceptor rod will extend below the surface of the fluidized particle bed inside the reactor vessel. In addition, in certain embodiments, the entire susceptor rod is immersed in the fluidized particle bed during operation of the reactor.

Because of the centrally positioned heating means, during operation of the subject reactors, a temperature gradient is produced within the reactor vessel. As such, zones of different temperatures are produced within the reactor vessel during operation. The zones of highest temperature are those proximal to the centrally positioned heating means while the zones of lowest temperature are those distal from the centrally positioned heating means, i.e. those zones proximal or adjacent to the reactor vessel walls. The temperature of the reactor zone most distal to the heating means will generally be at least about 10%, usually at least about 20% and more usually at least about 25% lower than the temperature of the reactor zone most proximal to the heating means. As such, in many embodiments the magnitude of the difference between the two zones will be at least about 50° C., usually at least about 75° C. and more usually at least about 100° C., where the temperature differential in many embodiments may be as great as 300° C. or greater.

Because the centrally positioned heating means, a convection type flow of the fluidized particle bed results inside the reactor vessel during operation. As such, those particles of the fluidized bed adjacent to the centrally located heating means move upward while those particles distal from the heating means, i.e. proximal to the walls of the reactor vessel, move downward. As such, the particles of the fluidized bed cycle through the different temperature zones within the reactor vessel.

In those preferred embodiments in which the heating means is a susceptor rod, the temperature of the susceptor rod during operation will be at least about 50° C. usually at least about 75° C. and more usually at least about 100° C., where the temperature of the susceptor rod may be as high as 2000° C. or higher, but will generally not exceed about 1500° C. in many embodiments. In embodiments having a susceptor rod(s) as a heating means, a means for producing an electromagnetic field inside the reactor vessel sufficient to raise the temperature of the susceptor rod to the desired value is also present. Generally, the electromagnetic field producing means will be one or more internally or externally positioned RF coils powered by an RF generator. By externally positioned is meant that the RF coil(s) is wrapped around the outside of the reactor vessel which is made of a non-conductive material. In such embodiments the susceptor rod and the RF coil(s) are generally positioned relative to each other such that coupling between the two elements is maximized for maximized heat absorption by the susceptor rod. By internally positioned is meant that the RF coil is typically in contact with the bed or embedded in an insulating wall which may be externally enclosed in a conductive, grounded vessel.

In addition to the above specified elements, the subject reactor will generally have one or more inlets for the introduction of gas, liquid or solid inert or reactive materials and an exhaust outlet. The various inlets and outlets may be positioned in the reactor to introduce particular reactants in different temperature zones of the reactor vessel, as may be desirable depending on the particular use for which the reactor is employed.

Figure 2:
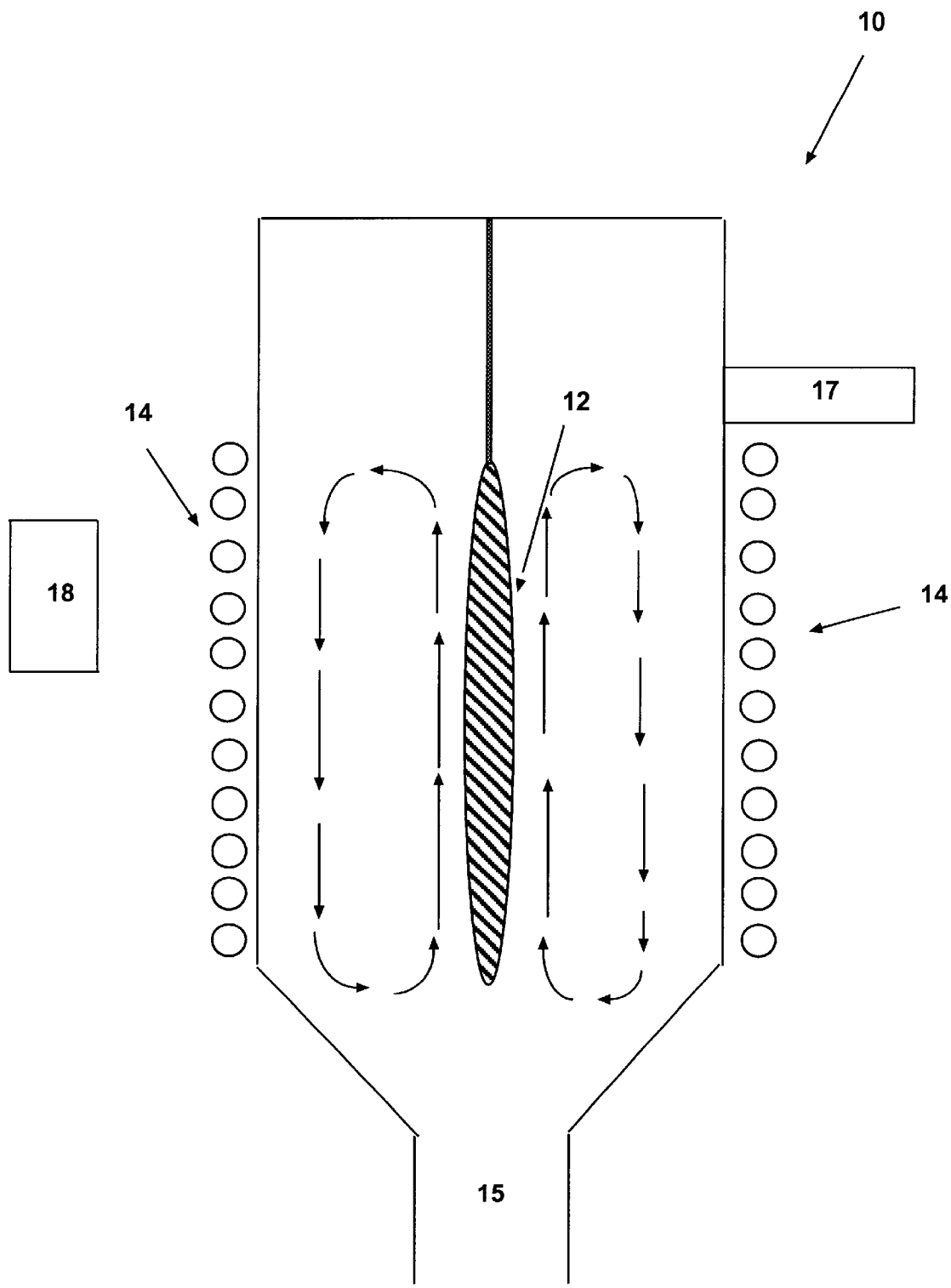
FIG. 2 shows the convection flow pattern of fluidized particles within a reactor according to the subject invention.

Turning now to the figures, FIG. 1 provides a representation of a reactor 10 according to the subject invention in which a susceptor rod 12 is centrally located within the reactor vessel and heated by externally. positioned RF coils 14 in operational relationship with an RF source 18. The susceptor rod 12 is completely immersed in the fluidized particle bed 16 within the reactor vessel. Reactor 10 further includes a gas inlet 15 and an exhaust 17. FIG. 2 shows the convection flow pattern of fluidized particles within a reactor according to the subject invention. In yet another embodiment of the subject invention, e.g. an industrial embodiment, the elements shown in FIG. 1 are house in a steel casing, where the RF coils are present in an insulating brick positioned between the inner wall of the reactor and the inner surface of the outer steel casing. The steel casing is grounded.

The subject reactors find use in a variety of different applications. Generally, applications in which the subject reactors find use are applications in which it is desired to react a fluidized particulate reactant with at least one additional reactant. The particulate reactant may be one of a wide variety of different reactants, including both conductive and non-conductive reactants. For example, where the heating means comprises a susceptor rod in combination with an RF coil, it has been found that adequate heating of the susceptor rod occurs despite the presence of conductive particles in the fluidized bed, as long as the diameter of the conductive particles is not too large and the frequency is not too high. Where conductive particles are present in the reactor, the diameter of the particles should not exceed about $150\mu$, and preferably should not exceed about $100\mu$ for MHz frequencies but may be mm size for KHz frequencies. With conductive particles, the applied frequency will generally not exceed about 10 Ghz, and in many embodiments will be substantially equal to or less than about 2.5 Ghz. Thus, depending on the parameters employed, the particulate reactant present may be either conductive or non-conductive.

In using the subject reactors, the first step, is to load the subject reactor vessel with the particulate reactant in a manner sufficient to produce a fluidized bed of the particulate reactant. The particulate reactant will generally be introduced through an appropriate feed into the interior of the reactor and then fluidized with an appropriate fluidizing medium under appropriate pressure and flow rate. The fluidizing medium that is employed may be any gaseous medium that is inert with respect to the substrate particles, as well as the first and second reactants, described in greater detail below. Examples of gaseous fluidizing mediums include: air, Argon, Nitrogen, and Helium. During operation, the flow rate of the fluidizing medium or gas flowing through the bed of the fluidized reactor may vary, depending upon the size and shape of the particles present therein, as well as the temperature and pressure of the gas. Usually a linear flow rate of from about 1 to about 10 centimeters/second will be employed. The pressure within the fluidized bed reactor will generally be only slightly above ambient to permit sufficient fluidization of the bed by the incoming gas pressure. However, pressures ranging from as little as 1 Torr to as much as 1500 Torr, preferably from about 100 Torr to about 1100 Torr, and most preferably from about 700 Torr to about 800 Torr, may be utilized in the reactor.

Following fluidization of the particulate reactant, at least a first reactant is introduced into the reactor vessel in a manner such that the first reactant comes into contact with the particulate reactant to at least interact with, e.g. react with or associate with (e.g. adsorb to), the particulate reactant. Depending on the particular purpose of the method, one or more additional reactants may also be introduced into the reactor vessel.

Representative applications in which the subject reactors find use include the production of electronic grade silicon and in the silica coating of titania particles, as illustrated in the Experimental Section, infra. While these applications are representative, the subject reactors find use in a variety of other applications, as will be apparent to those of skill in the art.

The following examples are offered by way of illustration and not by way of limitation.

EXPERIMENTAL

EXAMPLE 1

A reactor having a centrally positioned internal graphite susceptor rod and external RF coils, as shown in FIG. 1, is prepared. The reactor vessel is 10 cm in diameter and 20 cm high. The susceptor rod is a graphite rod of 1.5 cm od encapsulated in a sealed quartz tube of 2 cm od. It is observed that a frequency of 450 Khz is able to adequately heat the graphite susceptor rod in the presence of 100 micron particles with resistivities ranging from 0.01 ohm-cm to over 1000 ohm-cm. Silicon powders are introduced into the reactor and a fluidized bed is produced therefrom. The graphite rod is heated to over 1500° C. As a result, the bed near the rod has a temperature of over 1000° C. and produces a volcano-like effect within the reactor, with the hot particles being jetted upwards and the particles near the wall slowly progressing downwards at A temperatures below 600° C., thus creating a 400° C. temperature drop in a few cm of bed radius. The external reactor walls remain at temperatures around 300 to 200° C.

It is observed that when $SiHCl_3$—$H_2$ is injected into the reactor with the fluidizing gas, silicon deposition takes place on the fluidized particles in the bed with a minimum of deposition on the reactor walls. It is also found that when a Cl rich gas, e.g. $SiCl_4$, is injected near the reactor walls at the top of the reactor, deposition on the walls is further minimized.

EXAMPLE 2

In a reactor of similar dimensions to the ones described in Example 1, 0.5µ particles Ti metal are loaded and heated with a quartz encapsulated graphite heater. The Ti powder is heated to temperatures above 600° C. and reacted with HCl to produce Ti-subhalided for coating purposes and for Ti purification purposes.

EXAMPLE 3

A volume of titania particles is introduced into a fluidized bed reactor analogous to that described in Example 1. The temperature inside the reactor near the walls is maintained at 99° C. Next, water vapor is introduced into the reactor through a gaseous feed line at the top of the reactor near the reactor walls, whereby the water molecules adsorb to the surface of the titania particles. Adsorption of the water molecules onto the surface of the fluidized titania particles results in the production of water adsorbed titania particles. As the particles move with the convection currents through the reactor, they slowly move closer to the susceptor rod as they approach the bottom of the reactor. A slight excess of gaseous $SiCl_4$ is introduced into the reactor through a gaseous feed line into the bottom of the reactor. Contact of the gaseous $SiCl_4$ molecules with the adsorbed water molecules occurs as the particles move up the reactor near the susceptor rod, resulting in a heterogenous reaction on the surface of the titania particles to produce a silica coating on the particles. The temperature near the hot center can reach 900° C. As a result, titania particles coated with a compact layer of silica are produced.

It is evident from the above results and discussion that an improved fluidized bed reactor design is provided by the subject invention. Because of the centrally positioned heating means, temperature gradients and convection currents are set up in the reactor vessel, which is particularly useful in certain applications. Furthermore, in those preferred embodiments in which the heating means is a susceptor rod and a RF coil, a number of additional advantages are found. Such advantages include: simplicity of reactor design, no requirement for electrical feedthroughs, the ability to efficiently heat the interior of large reactors, the ability to perform reactions at high temperatures while maintaining the temperatures at the reactor walls low, a reduction in wall deposition of products and the problems associated therewith (e.g. clogging, breakage, etc.), and the like. As such, the subject invention provides for a significant contribution to the art.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A fluidized bed reactor comprising:
    a reactor vessel;
    at least one non-contaminating heating means centrally positioned inside said vessel such that during operation said heating means is at least partially immersed in a fluidized particle bed in said vessel wherein said heating means is a susceptor rod; and
    a means for generating an electromagnetic field inside said reactor vessel.

2. The reactor according to claim 1, wherein said means for generating an electromagnetic field inside said reactor vessel is at least one radio frequency coil.

3. A method of reacting a particulate reactant with a second reactant, said method comprising:

introducing said particulate reactant into a fluidized bed reactor according to claim 1 to produce a fluidized bed of said particulate reactant inside the reactor vessel of said reactor; and introducing said second reactant into said reactor vessel.

4. The method according to claim 3, wherein said particulate reactant is silicon.

5. The method according to claim 4, wherein said second reactant comprises silicon.

6. The method according to claim 3, wherein said particulate reactant is titania.

7. The method according to claim 6, wherein said second reactant is water vapor.

8. The method according to claim 7, wherein said method further comprises introducing a third gaseous reactant into said vessel which is capable of reacting with water adsorbed onto the surface of said titania particles to produce a product: on the surface of the said titania particles.

9. A fluidized bed reactor comprising:

a reactor vessel;

a susceptor rod centrally positioned inside said vessel such that said susceptor rod is at least partially immersed in a fluidized particle bed during operation of said reactor;

and at least one radio frequency coil positioned in association with said vessel and capable of generating an electromagnetic field inside said vessel.

10. The reactor according to claim 9, wherein at said reactor vessel is fabricated from a non-conductive material.

11. The reactor according to claim 10, wherein said radio frequency coil is positioned externally with respect to said vessel.

12. The reactor according to claim 9, wherein said susceptor rod comprises a conductive material.

13. The reactor according to claim 12, wherein said conductive material is selected from the group consisting of graphite, metal or cermetal.

14. The reactor according to claim 13, wherein said conductive material is encapsulated in an inert material.

15. The reactor according to claim 14, wherein said inert material is selected from the group consisting of: quartz, aluminum nitride, $Si_3N_4$, magnesia and alumina.

16. The reactor according to claim 9, wherein said reactor comprises a plurality of RF coils.

17. A fluidized bed reactor comprising:

a reactor vessel fabricated from an inert, non-conductive material;

a susceptor rod of a conductive material encapsulated in an inert material and centrally positioned in said vessel such that during operation said susceptor rod is a least partially immersed in a fluidized particle bed in said vessel; and a plurality of radio frequency coils externally positioned with respect to said vessel and capable of generating an electromagnetic field inside said vessel.

18. The reactor according to claim 17, wherein said non-conductive material is selected from the group consisting of: quartz, glass, silicon nitride, aluminum nitride and alumina.

19. The reactor according to claim 17, wherein said conductive material of said susceptor rod is selected from the group consisting of: graphite, metal or cermetal; and said inert material of said susceptor rod is selected from the group consisting of: quartz, aluminum nitride, $Si_3N_4$, magnesia and alumina.

20. A fluidized bed reactor comprising:

a reactor vessel fabricated from an inert, transparent material;

a fluidized particle bed inside said reactor vessel;

a susceptor rod centrally positioned inside said reactor vessel and at least partially immersed in said fluidized particle bed; and a plurality of radio frequency coils positioned in association with said vessel and capable of generating an electromagnetic field inside said vessel.

21. The reactor according to claim 20, wherein a temperature gradient is present inside said reactor vessel.

22. The reactor according to claim 20, where in said fluidized particle bed, the particles proximal to said susceptor rod move upward and the particles distal from said susceptor rod move downward.

23. The reactor according to claim 20, wherein said susceptor rod is at a temperature ranging from about 50 to 2000° C.

24. A fluidized bed reactor comprising:

a reactor vessel;

at least one non-contaminating heating means centrally positioned inside said vessel such that during operation said centrally positioned heating means is at least partially immersed in a fluidized particle bed in said reactor vessel, said centrally positioned heating means configured to produce a temperature gradient within said reactor vessel with a zone of highest temperature being proximal to said centrally positioned heating means.

25. The fluidized bed reactor of claim 24, wherein said centrally positioned heating means is configured to produce a convection type flow in a fluidized particle bed in said reactor vessel wherein particles of said fluidized particle bed adjacent to said centrally located heating means move upward, while particles of said fluidized particle bed proximal to walls of said reactor vessel move downward.

* * * * *